United States Patent [19]
Wagner et al.

[11] Patent Number: 5,400,590
[45] Date of Patent: Mar. 28, 1995

[54] FILTER CARTRIDGE ARRANGEMENT

[75] Inventors: Wayne M. Wagner, Apple Valley; Bruce B. Hoppenstedt, Bloomington; Edward A. Steinbrueck, Eden Prairie; Daniel T. Risch, Minneapolis; Richard P. Ryan, St. Louis Park, all of Minn.

[73] Assignee: Donaldson Company, Inc., Minneapolis, Minn.

[21] Appl. No.: 122,144

[22] Filed: Sep. 16, 1993

[51] Int. Cl.⁶ ............................................. F01N 3/20
[52] U.S. Cl. ...................................... 60/274; 60/286; 60/300; 60/303
[58] Field of Search ................. 60/274, 284, 286, 300, 60/303, 320

[56] References Cited

U.S. PATENT DOCUMENTS

| | | | |
|---|---|---|---|
| 4,535,589 | 8/1985 | Yoshida | 60/303 |
| 4,573,317 | 3/1986 | Ludecke . | |
| 4,589,938 | 10/1985 | Oishi | 60/286 |
| 4,672,809 | 6/1987 | Cornelison | 60/286 |
| 4,788,819 | 12/1988 | Henkel . | |
| 4,791,785 | 12/1988 | Hudson et al. . | |
| 4,811,559 | 3/1989 | Henkel . | |
| 4,974,414 | 12/1990 | Kono | 60/286 |
| 5,014,511 | 5/1991 | Wade | 60/303 |
| 5,044,157 | 9/1991 | Henkel | 60/274 |
| 5,224,973 | 7/1993 | Hoppenstedt et al. . | |
| 5,829,766 | 5/1989 | Henkel . | |

OTHER PUBLICATIONS

Co-pending application Ser. No. 08/047,772, filed Apr. 14, 1993.

Primary Examiner—Ira S. Lazarus
Assistant Examiner—Daniel J. O'Connor
Attorney, Agent, or Firm—Merchant, Gould, Smith, Edell, Welter & Schmidt

[57] ABSTRACT

Trap for filtering particulates from diesel engine exhaust including filter cartridge arrangement having heat enhancement elements. In the case of exhaust gases flowing through a filter cartridge from inside to out and the cartridge having an inner tubular heater, heat enhancement elements include a heat insulator plugging the downstream end of the cartridge, a plurality of flow distribution rings which inhibit flow to the end of the cartridge thereby causing more even flow through the cartridge nearer the upstream end, and mechanism for controlling regeneration on-time as a function of vehicle system voltage and pre-energization heater temperature. In the case of a filter cartridge having flow from outside to in and having an outer heater, heat enhancement elements include a tubular, non-filtering, heat insulating sleeve about the heater and mechanism for controlling on-time as a function of vehicle system voltage and pre-energization heater temperature.

11 Claims, 13 Drawing Sheets

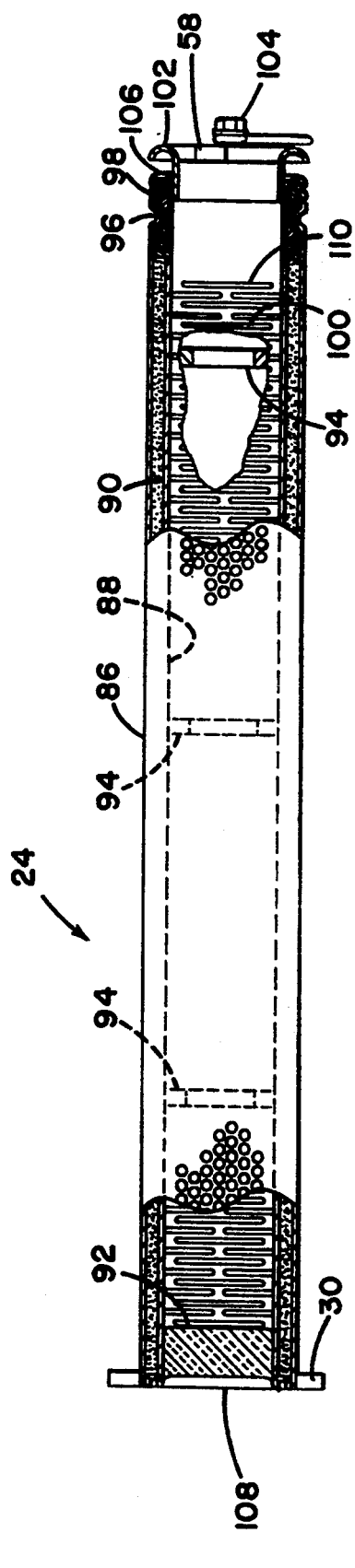
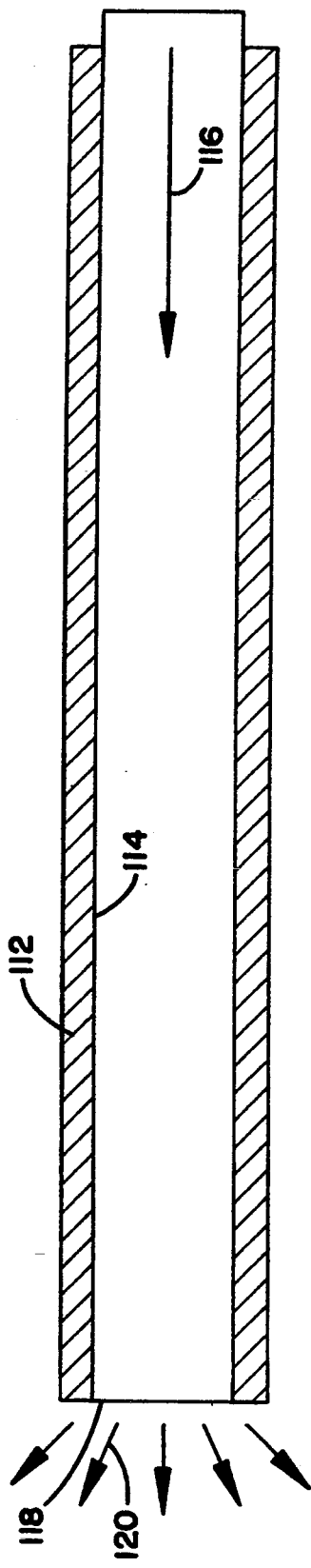
FIG. 2
FIG. 3

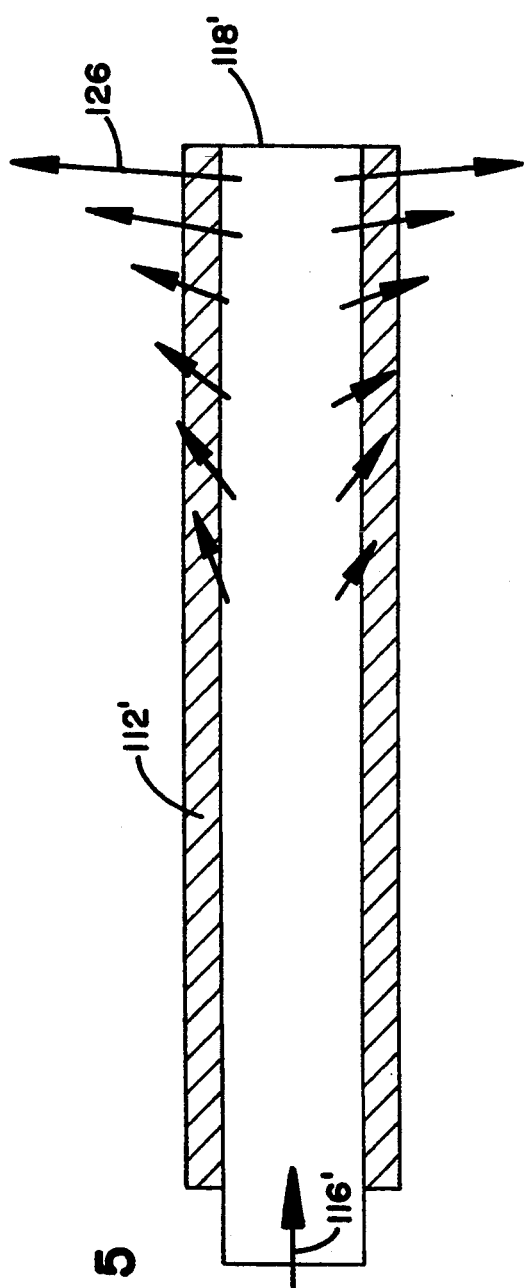
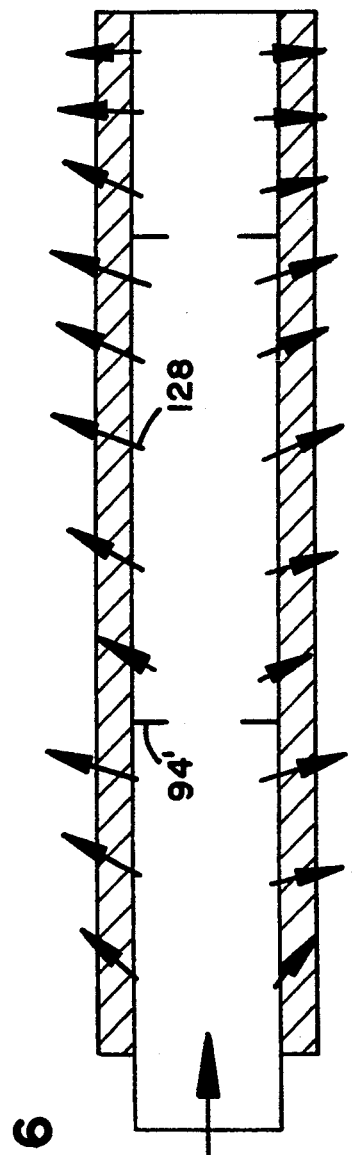

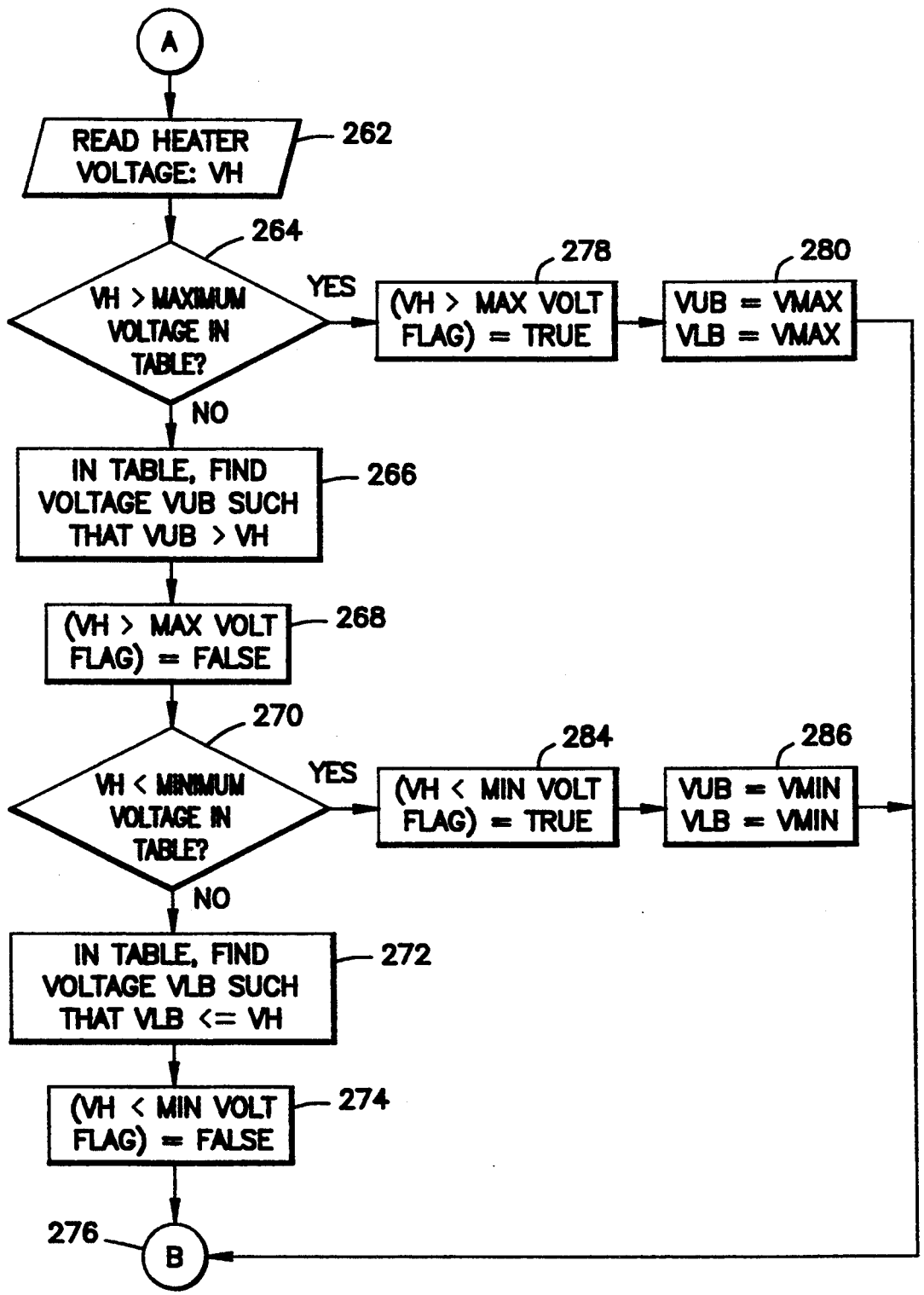

FILTER CARTRIDGE ARRANGEMENT

FIELD OF THE INVENTION

The present invention relates to filter cartridges for trap assemblies for exhaust gases of internal combustion engines, especially diesel engines.

BACKGROUND OF THE INVENTION

Particulate emissions (black smoke) from diesel engines is significant. Trap devices for filtering the particulates from the exhaust gases are known. One form of trap device includes a ceramic element which may be segmented or not, for providing filtration of the exhaust gases. Another form of trap device includes filter cartridges. In this latter form, cartridges have been disclosed having heaters of various forms, including a ring, a rod, a slotted tube, etc. Known cartridges include the elements of a heater, a filter media, and adequate support for them. The present invention is directed to filter cartridge technology and is distinguished in that improvements to the basic form of a filter cartridge are presented to better conserve heat and to increase heater longevity.

SUMMARY OF THE INVENTION

The present invention is directed to a filter cartridge arrangement which removes particulates from exhaust gases of an engine of a vehicle. The filter cartridge arrangement includes a tubular support member, a tubular heater, and tubular means for filtering which is retained between the support member and the heater. The arrangement further includes a heater enhancement element and mechanism for energizing the heater.

Heater enhancement elements include a non-filtering, heat insulating sleeve fixed around an external heater, a heat insulator which not only physically plugs one end of an internal tubular heater, but also retains heat generated by the heater within the filter cartridge during regeneration, and flow distribution rings spaced along the internal surface of an internal heater which make exhaust gases flow more uniform through the filter and, consequently, provide for better distribution of particulates trapped by the filter.

The mechanism for energizing the heater so that the heater and heater enhancement element can properly heat the particulates for filter regeneration is directed to mechanism for sensing the voltage of the vehicle electrical system and also for sensing the temperature of the exhaust gases and, based on those parameters, determining an appropriate on-time for the heater so that the heater reaches an adequate temperature for efficient particulate combustion, but does not exceed a temperature which leads to rapid heater deterioration.

The invention can be better understood from and is more fully disclosed in the detailed description following the summary of the drawings.

BRIEF DESCRIPTION OF THE DRAWINGS

FIG. 2 is a longitudinal, cross-sectional view of a filter module of the type shown in FIG. 1;

FIG. 3 is an illustration of a filter module without a heat insulator at the end of a heater;

FIG. 5 is an illustrate on of inside-out flow for a prior art filter module;

FIG. 6 is an illustration similar to FIG. 5 showing also flow distribution rings and their effects on flow;

DETAILED DESCRIPTION OF THE PREFERRED EMBODIMENT

Figure 1:
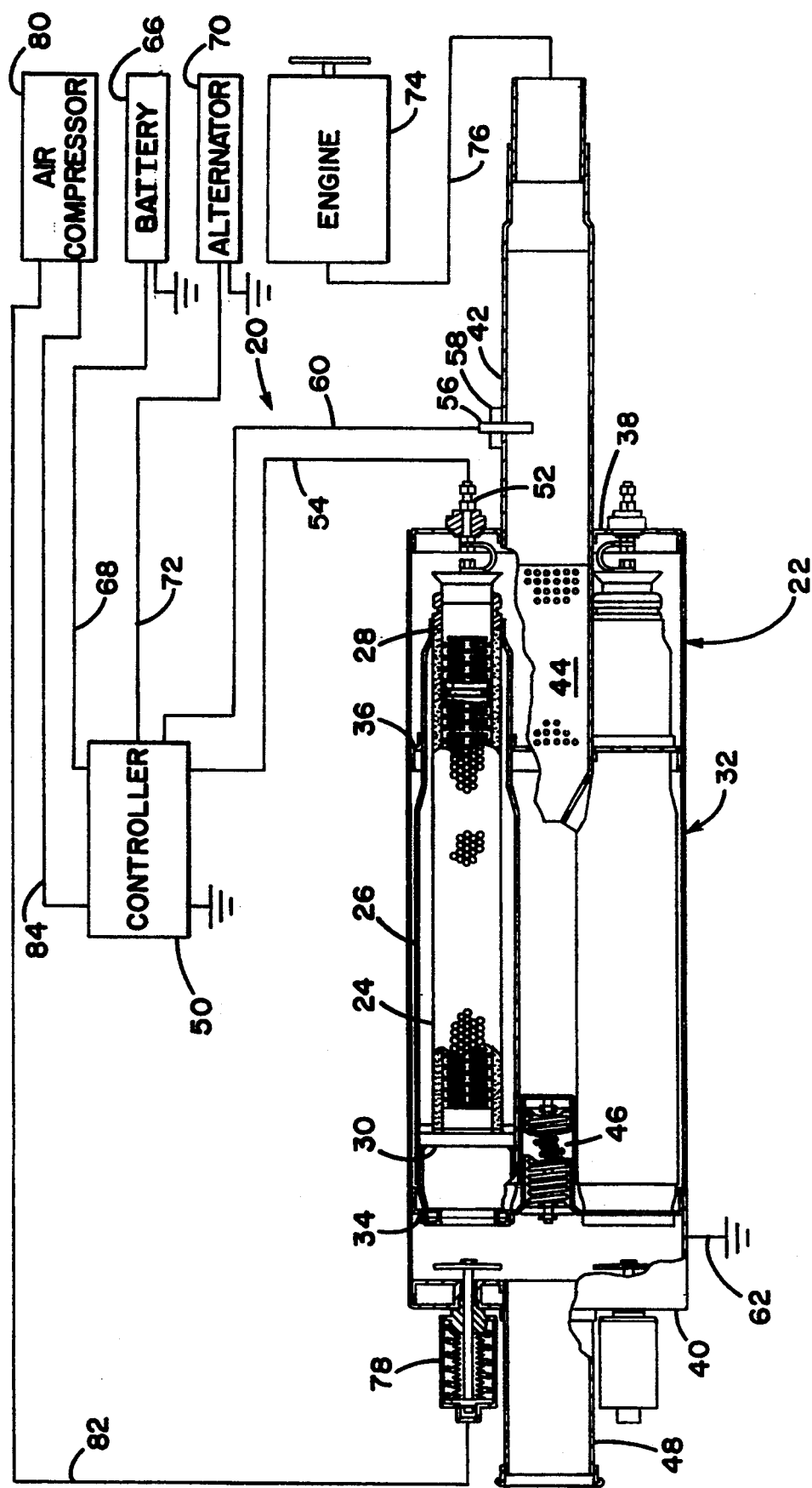
FIG. 1 is a side view of a representative trap, partially broken away, showing a filter module arrangement having inside to out flow in accordance with the present invention.

Referring now to the drawings wherein like reference numerals designate identical or corresponding parts throughout the several views, and more particularly to FIG. 1, a filter module arrangement in accordance with the present invention is designated generally by the numeral 20 as installed in a typical trap apparatus 22.

Filter Module with Internal Heater

Trap apparatus 22 is shown to include filter modules 24 mounted in a flow-directing tube 26. Tube 26 is fastened at 28 to support tube 86 of each filter module 24 near its inlet end. A spider 30 supports each filter module 24 relative to tube 26 at its downstream end. Each tube 26 is supported relative to trap housing 32 with baffles 34 and 36. Baffle 34 prevents gases from flowing past. Housing 32 has an upstream end 38 and a downstream end 40. Centered in upstream end 38 is an inlet tube 42. Inlet tube 42 is perforated in a region between upstream end 38 and baffle 36 so that exhaust gases flowing from perforations 44 expand into the inlet ends of filter modules 24. The downstream end of inlet tube 42 is partially open and communicates with a relief valve 46 in baffle 34 in case the filter modules 24 become clogged and create too great a backpressure. In that case, relief valve 46 opens and allows direct flow to exhaust pipe 48 centered in downstream end 40 of housing 32.

Each heater 88 of filter modules 24 is in electrical communication with controller 50 through an electrode arrangement 52 in the upstream end 38 of housing 32 via a line 54. Housing 32 is an electrical ground as indicated by. The symbol 62 so that the downstream end of heater 88 is grounded through bracket 30, tube 26, and bracket 34. Thus, heater 88 is a part of an electrical circuit which includes controller 50. Controller 50 is energized by either the vehicle electrical system battery 66 via line 68 or the vehicle alternator 70 via line 72.

A thermocouple 56 is supported in inlet tube 42. Thermocouple 56 is in electrical communication with controller 50 through insulated boss 58 via line 60.

The exhaust gases from engine 74 flow through line 76 to inlet pipe 42. When particulates filtered from the exhaust gases from engine 74 have collected sufficiently in any of filter modules 24 so that regeneration is desired or required, the flow path through one or more of the filter modules 24 can be closed so that one or more of heaters 88 can be energized to combust the collected particulates and regenerate the filter module. Air-driven valve 78 (normally open) mounted to downstream end 40 of housing 32, when closed, provides closure against the downstream open end of tube 26. Air source 80 is in pneumatic communication via line 82 and is controlled by controller 50 via line 84.

With reference to FIG. 2, filter module 24 includes an outer tubular support member 86, an inner tubular heater 88, and filter media 90 therebetween. Filter module 24 further includes heater enhancement elements in the form of a heat insulator 92 and flow distribution rings 94.

Module length and diameter depend on the capacity of filtration desired. In that regard, support member 86 is perforated and tubular having a length which defines the length of the filter module 24. The diameter is determined by the space available in housing 32 considering the number of filter modules desired for installation in the housing. A crimp 96 is formed near the inlet end of module 24 and presses into rope insulation 98 installed at the end of media 90 between support member 86 and heater 88. Support member 86 may be an actual metallic tube or may be a metallic sheet rolled as appropriate and welded together at a seam.

Heater 88 is shown as a slotted tube, but could be any form of a tubular heating arrangement. Heater 88, as shown, is more fully disclosed in U.S. Pat. No. 5,224,973 issued Jul. 6, 1993, hereby incorporated by reference. Heater 88 has rows of slots beginning at locations spaced inwardly from each end of the tubular member. Slots 100 are elongated with each row extending in the direction of elongation and centered on a transverse plane relative to the tubular member. Consecutive rows are offset from one another so that ends of slots in one row are approximately at the middle of slots of adjacent rows. The tubular member may be an actual tube or, preferably, a stamped sheet rolled and welded together to form a tube. At the inlet end, heater 88 extends beyond the end of support member 86. Mechanism for forming electrical communication is provided at the heater end. In this regard, a bellmouth member 102 is welded to the end of heater 88. A stud and nut combination 104 is attached to the bellmouth member 102 to provide connection as needed with electrode 52. A collar 106 is pressed against insulation rope 98 such that a space is retained between collar 106 and support member 86. Collar 106 is welded to heater 88 to retain the compression of rope insulation 98. Collar 106 and support member 86 are spaced apart so there is no electrical shorting. At the downstream end of filter module 24, support member 86 and heater 88 end at approximately the same transverse plane and are fastened together with a solid baffle 108 welded to both to form electrical communication between both. Bracket 30 is fastened to support member 86, or may be fastened to baffle 108.

Insulating disc 92 is pressed against baffle 108 with both plugging the downstream end of heater 88. Disc 92 is made of a heat insulating material and has a thickness sufficient to inhibit the transfer of a significant percentage of heat energy available within the tubular interior of heater 88.

Flow distribution rings 94 are metallic rings spaced between insulation disc 92 and the end 110 of slots 100 opposite insulation disc 92. Two rings 94 are shown, however, the number of rings is determined for each particular diameter and length of module 24 so as to best enhance the flow of exhaust gases in the most uniform fashion from end to end.

Heater 88 reaches temperatures which cause it to be vulnerable to expansion stresses and generally to a loss of structural strength. Rings 94 not only function to make flow more uniform, but also to provide the additional advantage of transverse strengthening for heater 88. The definite retention of the downstream end of heater 88 by baffle 108 and the upstream end of heater 88 by collar 106 relative to crimp 96 holds heater 88 at a relatively consistent length and prevents longitudinal movement during heating, an otherwise common problem.

Filter media 90 may be constructed from ceramic fiber yarn, a woven matting from ceramic fiber or a nonwoven random array of ceramic fibers entangled together or bonded with a separate binder into mat, or ceramic foams. An acceptable material for insulator disc 92 is Fibermax mat commercially available from Carborundum Company, Niagara Falls, N.Y. An acceptable material for insulating rope 98 is a fiber glass twisted rope commercially available from McMaster Carr Supply Company, Chicago, Ill.

A preferred material for heater 88 is Inconel 600 commercially available from Metal Goods Service Center, Kansas City, Mo. Other similar materials are likely acceptable as well. In any case, it is noted that these materials tend to have an oxidation limit of a temperature within 100° F. or so of 1600° F. At these high temperatures, these materials also have lower material strength and can deform.

Figure 4:
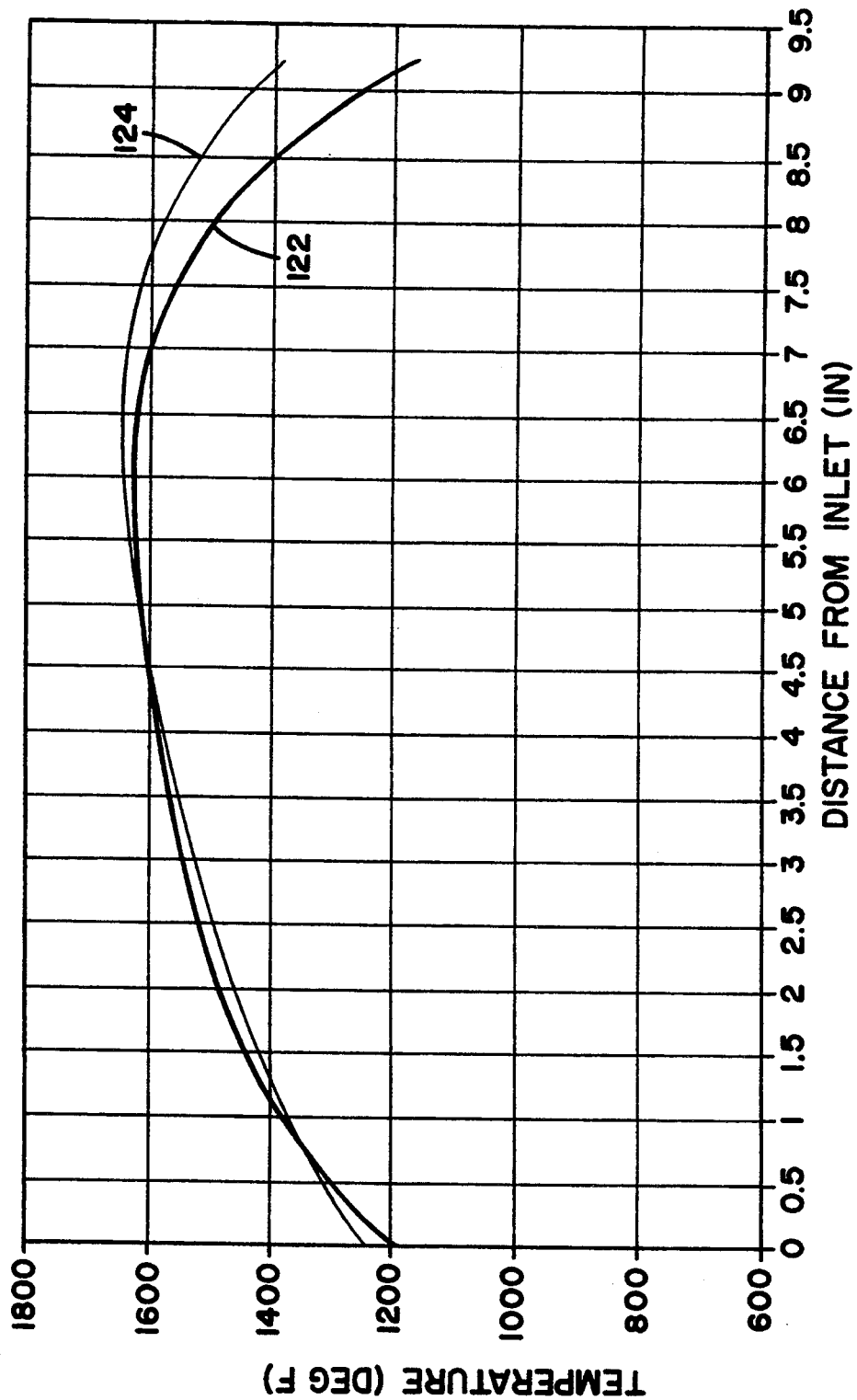
FIG. 4 is a graph of heater temperature versus longitudinal distance from inlet comparing heaters with and without a heat insulator at the end.

In general, cylindrical filter/heater assemblies have the common trait of having a significant axial thermal gradient (see FIG. 4). A cylindrical heater has a temperature in the middle commonly several hundred degrees higher than at the ends. This is due to the capability of the exposed metal ends of the heater to reject heat to the cooler surroundings, and the incapacity of the central portion of a filter cartridge to reject heat due to the insulating properties of the filter media and the higher temperature of the adjacent portions (see FIG. 3). The problem with this temperature difference is that in order to achieve successful regenerations, a lower limit temperature and time at the lower limit temperature must be reached over the entire filter length. If the lower limit temperature is reached only in the center portion, the cooler ends of the filter may not regenerate completely, and will not be usable filter surface for subsequent particulate loading intervals. This, of course, reduces the effective filter area of the trap. If the heater is allowed to reach suitably high temperatures on the ends, and if the temperature differential is great between the center and the ends, the central temperature peak will likely exceed the rating of the heater material. Ideally, a heater would have characteristics that would result in a uniform axial temperature so that the ends regenerate satisfactorily and the central portion remains below the maximum temperature rating of the heater material.

Insulating disc 92 conserves heat energy at the downstream end. A tubular filter 112 with an internal tubular heater 114 is illustrated in FIG. 3. Exhaust gases flow in the direction of arrow 116 from inside to outside. The downstream end of the tubular filter is closed with plug 118. Plug 118, however, is uninsulated and as arrows 120 show, heat is radiated away from the end of the filter tube. Heat is also radiated away from the inlet end, and furthermore, the convective current of exhaust gases flowing into the tubular filter carries heat energy toward the central length of the tube.

The advantage of insulating disc 92 at the downstream end as installed in filter module 24 of FIG. 2 relative to a tubular filter which does not have an insulating disc as depicted in FIG. 3, is evidenced in the curves of temperature versus distance from inlet shown in FIG. 4. The curves were obtained using a heater, filter media, and a perforated tube assembly. A thermocouple was positioned along the heater axis to obtain the temperatures as a function of distance from the inlet. Curve 122 represents an assembly without an insulation disc, while curve 124 represents an assembly with an insulation disc, such as disc 92 in FIG. 2. It is noted that temperature decreases rapidly along the last three inches of length for the uninsulated condition of curve 122. The decrease of temperature for the insulated condition as depicted by curve 124 is much less rapid, and at the end of the filter tube, there is a difference in temperature between the two configurations of more than 200° F.

Another filter tube, similar to that of FIG. 3, is depicted in FIG. 5. Exhaust gases flow is shown by arrow 116'. Most of the exhaust gases flow to plug 118' and then are forced at a greater rate from inside to outside nearer plug 118' than the rest of the axial length of the tubular filter as depicted by the length of arrows 126. That is, exhaust gases flow is biased toward the downstream end. The filter media 112' thus loads more heavily toward the downstream end, and there is less efficient use made of the rest of the filter area.

Another tubular filter, like that of FIGS. 3 and 5, is shown in FIG. 6, except distribution rings 94' are also shown. As a result of the distribution rings 94', exhaust gases flow is impeded along the axial length of the tubular filter, and there is consequently more evenly distributed inside to outside flow throughout the length as depicted by the length of arrows 128, relative to arrows 126. Advantages then of flow distribution rings 94' are more uniform flow, more even loading of particulates, as well as radial support for the heater as discussed hereinbefore. Furthermore, to the degree that flow helps influence heater and media temperature, there is also then better temperature distribution and control.

Filter Module with External Heater

Figure 8:
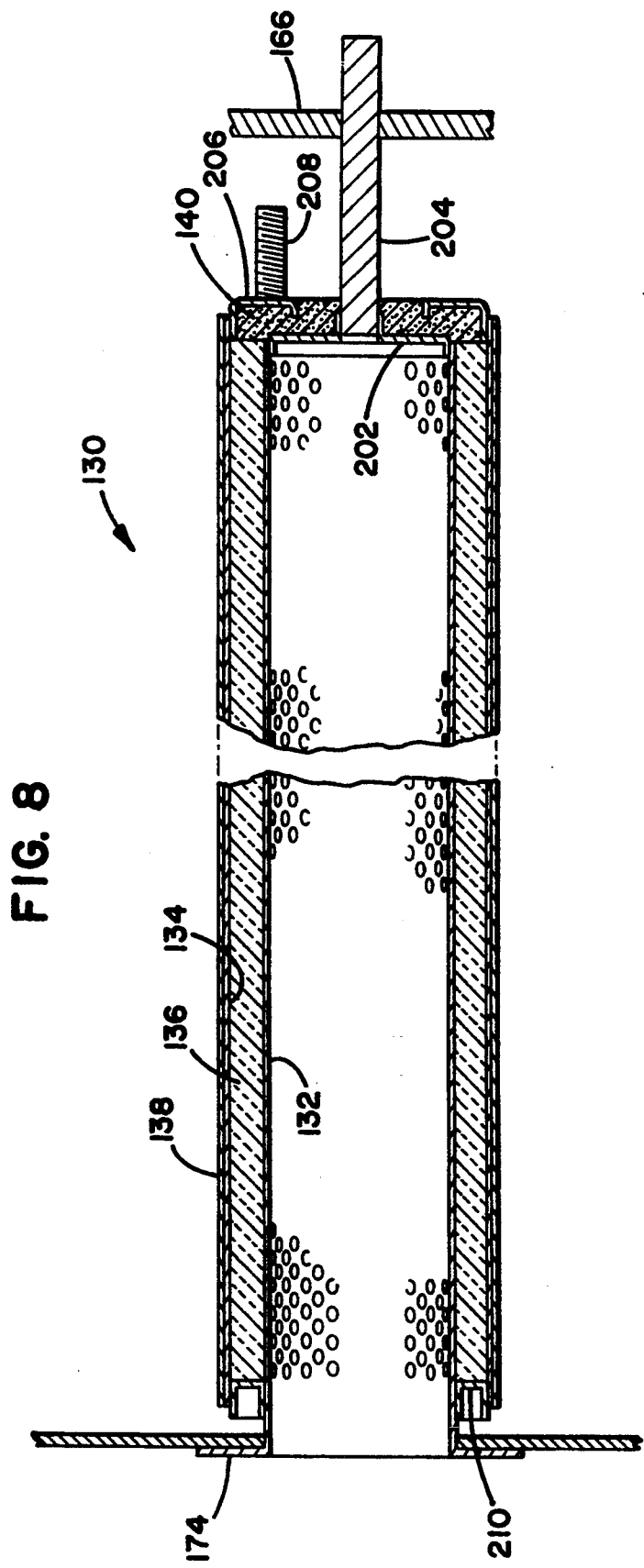
FIG. 8 is a cross-sectional view of a filter cartridge in longitudinal cross-section, showing an external heater with a heat-insulating sleeve thereabout.

In a second embodiment, a filter tube module 130 has a tubular, perforated support member 132 on the inside, a tubular heater 134 on the outside, and filter media 136 therebetween (see FIG. 8). Heater enhancement elements in the form of a tubular, non-filtering, heat insulating sleeve 138 surrounds heater 134, while an insulating disc 140 provides heat retention at the downstream end of the tubular design.

Figure 7:
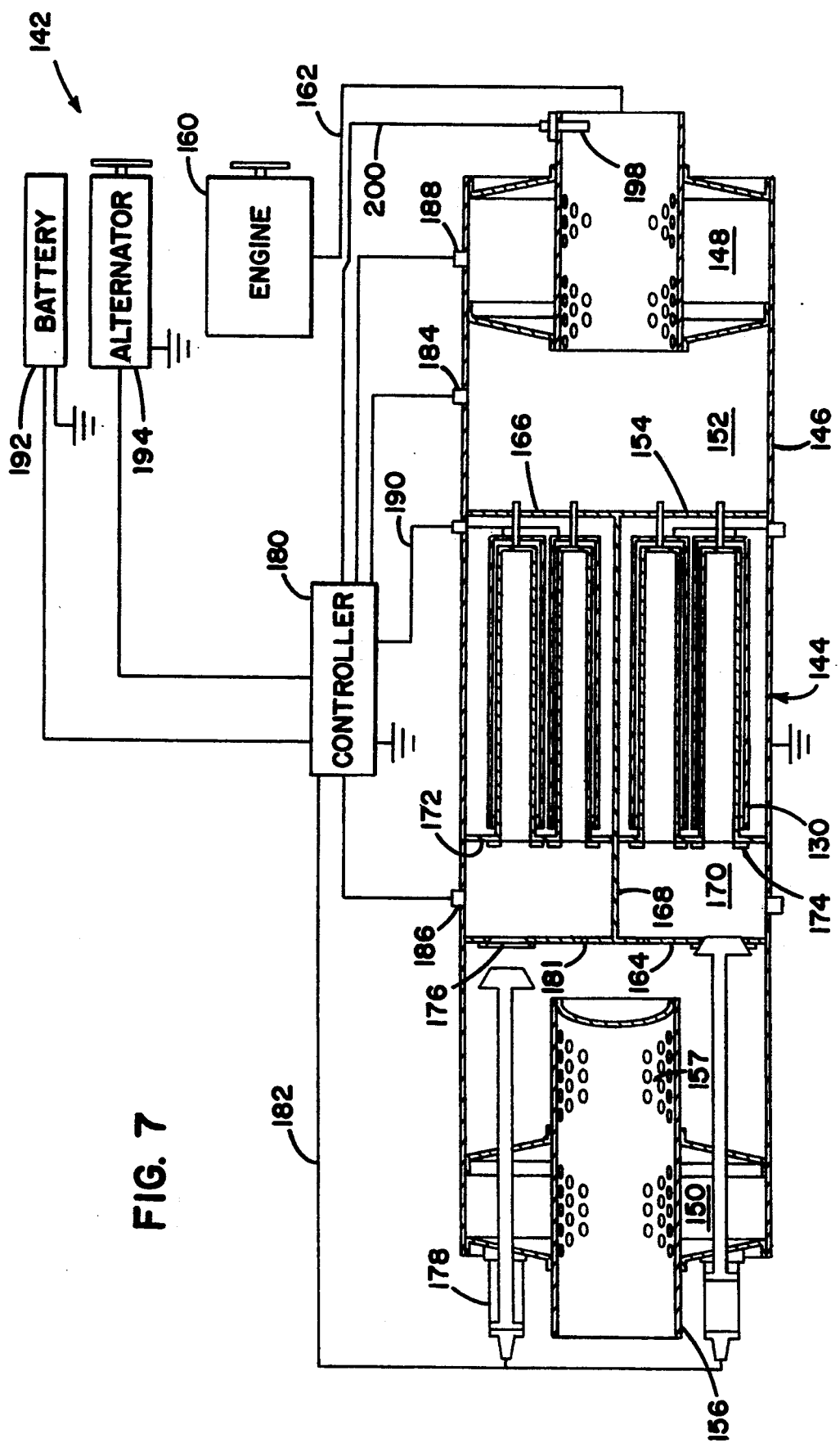
FIG. 7 is a side, cross-sectional view of another representative trap showing a filter module arrangement having outside to in flow in accordance with the present invention.

Filter module 130 is shown in a system arrangement 142, including trap apparatus 144 in FIG. 7. Apparatus 144 is shown as a muffler housing 146 having resonating chambers 148 and 150 at opposite ends and a chamber 152 therebetween within which there is installed an assembly 154 including a plurality of filter modules 130. Inlet pipe 158 extends through and is supported by the walls of resonating chamber 148, while outlet pipe 156 extends through and is supported by the walls of resonating chamber 150. Inlet pipe 158 receives exhaust gases from engine 160 via line 162.

Assembly 154 includes an upstream baffle 166 and a downstream baffle 164 separated by walls 168 extending therebetween and extending to the cylindrical wall of muffler housing 146 to separate the space between baffles 164 and 166 into a plurality of compartments 170. One or more filter modules 130 are supported in each compartment 170 by a baffle 172 at the outlet end of modules 130 and by baffle 166 at the inlet end. Baffle 166 is perforated so that exhaust gases can flow freely into compartments 170. Gases flow from outside to inside through the walls of filter modules 130. Flow proceeds from filter modules 130 through the openings defined by flanges 174 at baffle 172 to openings 176 in baffle 164. Gases are then exhausted from outlet pipe 156 through perforations 157.

Electrically-energized, poppet valves 178 are supported at the downstream end of trap apparatus 146 and are normally positioned to leave openings 176 open. Valves 178 are controlled by controller 180 via line 182 and, as appropriate, function to close an opening 176 when the filter modules 130 in a particular compartment 170 are determined to require regeneration. Some flow continues through a leakage opening 181 even when a compartment is closed so that oxygen remaining in the exhaust gases can continue to fuel combustion for regeneration.

Controller 180 is connected to pressure sensors 184 and 186 on opposite sides of filter modules 130 and to pressure sensor 188 in the upstream resonating chamber. The various sensors function to determine when regeneration is desirable for particular filter modules in accordance with a method disclosed in U.S. Pat. No. 4,851,015.

Heaters 134 of filter modules 130 are in electrical communication with controller 180 via lines 190. Power is provided either by the vehicle battery 192, or the alternator 194. The alternator, controller, and trap apparatus are appropriately grounded. The starting temperature of heater 134 is sensed with a thermocouple 198 connected to controller 182 via line 200. Thermocouple 198 is located in inlet pipe 158.

Filter module 130 is shown in more detail in FIG. 8. Support member 132 is a perforated tube with a closure 202 at the upstream end and a flange 174 extending outwardly at the downstream end. A rod 204 is attached to closure 202 and extends axially away from filter module 130. Rod 204 extends through an opening in baffle 166, thereby supporting filter module 130 at the upstream end.

Filter media 136 is similar to that indicated to be appropriate with respect to filter module 24.

Heater 134 is also tubular and can be slotted as disclosed with respect to heater 88 or can have some other design. A flanged ring 206 is welded or otherwise attached to the upstream end of heater 134. Insulating disc 140 is retained between ring 206 and disc closure 202. Filter media 136 extends to insulating disc 140. The inside edge of ring 206 is spaced from rod 204 to avoid electrical contact. A stud 208 extends from ring 206 to provide an electrode to connect with controller 182 via line 190.

Support member 132 extends beyond heater 134 at the downstream end. A flanged ring 210 fits between support member 132 and heater 134 at the downstream end and is fastened to each with filter media 136 extending thereto. Since support member 132 is grounded to the housing of trap apparatus 146, heater 134 completes a circuit with controller 182.

Insulating sleeve 138 functions as a heater enhancement element so as to insulate heater 134 and direct heat to filter media 136 and not waste heat to the external surroundings. The insulating sleeve should not filter. If the sleeve filters, convective combustion flow during regeneration moves heat from outside to inside and, therefore, away from the insulating sleeve. If it were to filter, it has been found that there is not generally sufficient heat for reliable combustion of particulates collected on the sleeve and therefore not reliable regeneration of the sleeve. The sleeve should also not unduly restrain the heater to avoid causing the heater to deform when it is at a high temperature and in a weakened state.

The insulating sleeve is preferably made of a woven material having openings of a minimum dimension sufficient to allow the largest agglomerated particle to pass through. It is important that individual strands be smooth, not fuzzy, to maintain low filtering efficiency. The material must be compatible with the maximum temperature that will be experienced on the outer surface of the heater. A typical maximum temperature is 1750° F.

An exemplary material which meets the criteria indicated is NEXTEL "H. D. Satin Weave" material available from 3M Company, St. Paul, Minn. NEXTEL is a trademark of 3M Company. The indicated material has the following preferred properties: two-dimensional percent open of 10%, typical open square dimension of 0.045 inch, each strand being integral and smooth and having a 0.06 inch nominal diameter, a possible weave being a cross-weave with three strands under and one strand over, and the thickness of the weave being 0.12 inch.

Figure 9:
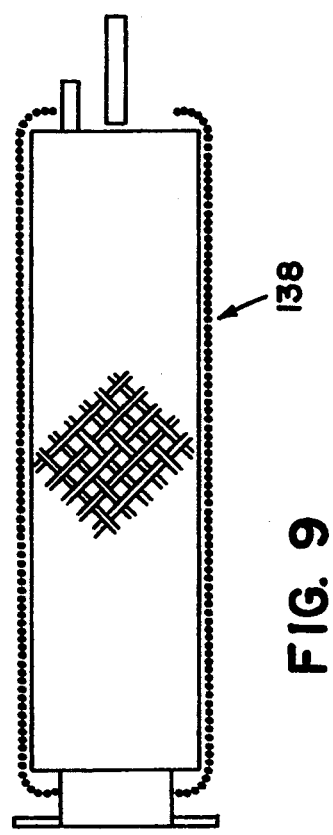
FIG. 9 is an illustration showing the orientation of the weave of the sleeve of FIG. 8 relative to the filter cartridge.

As indicated in FIG. 9, insulating sleeve 138 is preferably a tubular, stretchable shape that can be pulled over the heater 134 and then pulled tight so as to be constricted to a smaller diameter at each end of heater 134 thereby being readily attached at each end. Preferably, the weaved material is oriented so that opposite corners of each square opening 214 are aligned longitudinally and transversely. Another advantage of the tubular sock form is the elimination of a longitudinal seam.

Figure 10:
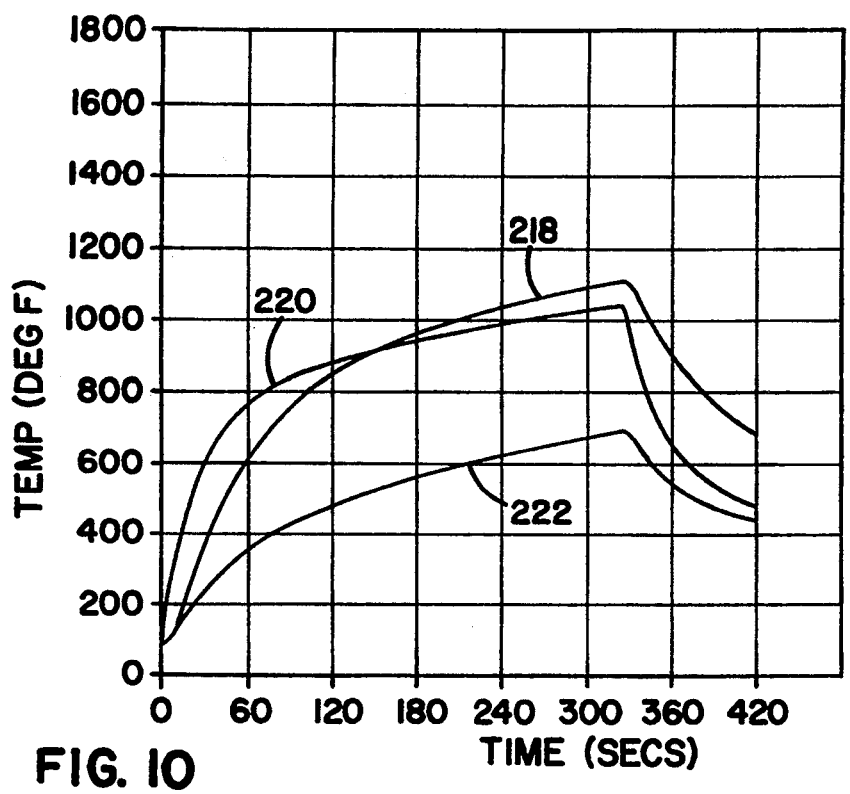
FIG. 10 shows a graph of temperature versus time of a filter cartridge, without a heat-insulating sleeve.
Figure 11:
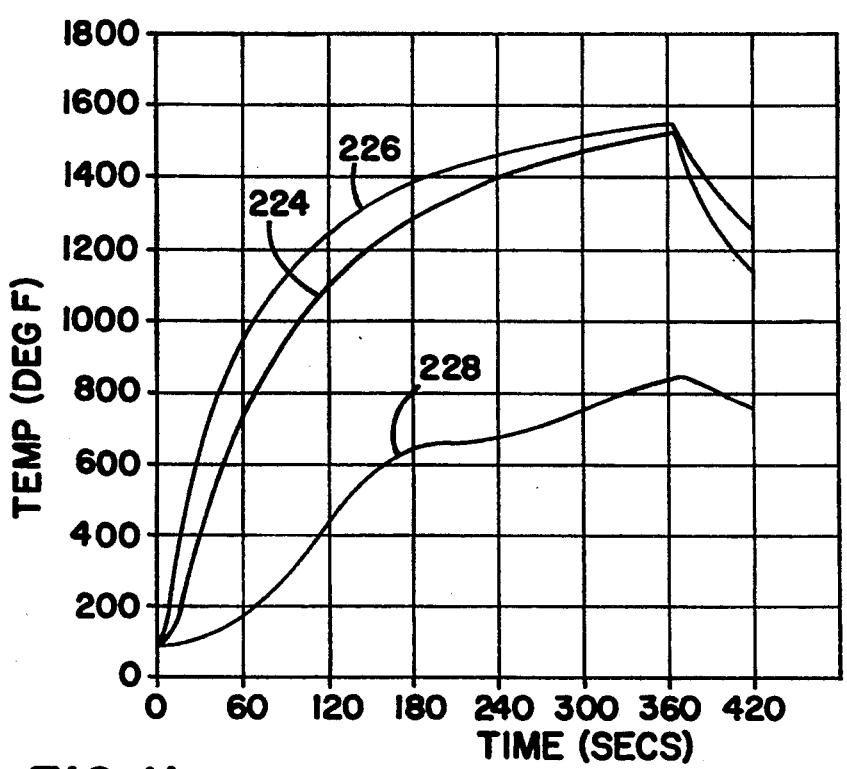
FIG. 11 shows a graph of temperature versus time of a filter cartridge in accordance with the present invention, including a heat-insulating sleeve.

Graphs of temperature versus time are shown in FIGS. 10 and 11. In FIG. 10, curve 218 is the temperature of heater 134, curve 220 is the temperature of filter media 136, and curve 222 is the temperature of the air space in the interior of filter module 130. The curves of FIG. 10 were made without an insulating sleeve 138. The curves of FIG. 11 are similar to those of FIG. 10 and made with the same module as used for those of FIG. 10, except the module included an insulating sleeve installed about the heater. Curve 224 is the temperature of the heater, curve 226 is the temperature of the filter media, and curve 228 is the temperature of the air space in the interior of filter module 130.

On comparison of FIGS. 10 and 11, it is clear that temperatures rise much higher with a module having an insulating sleeve, than with one not having an insulating sleeve. Looking at curves 220 and 226 for the temperature of the filter media, at 60 seconds, the temperatures are roughly the same; at 180 seconds, the module with an insulating sleeve is approximately 300° F. hotter, while at 300 seconds, it is approximately 500° F. hotter. The higher media temperature leads to quicker and more reliable particulate combustion and therefore module regeneration, as discussed more fully hereinafter.

Heater On-Time as a Function of Vehicle Voltage and Heater Starting Temperature

Figure 12:
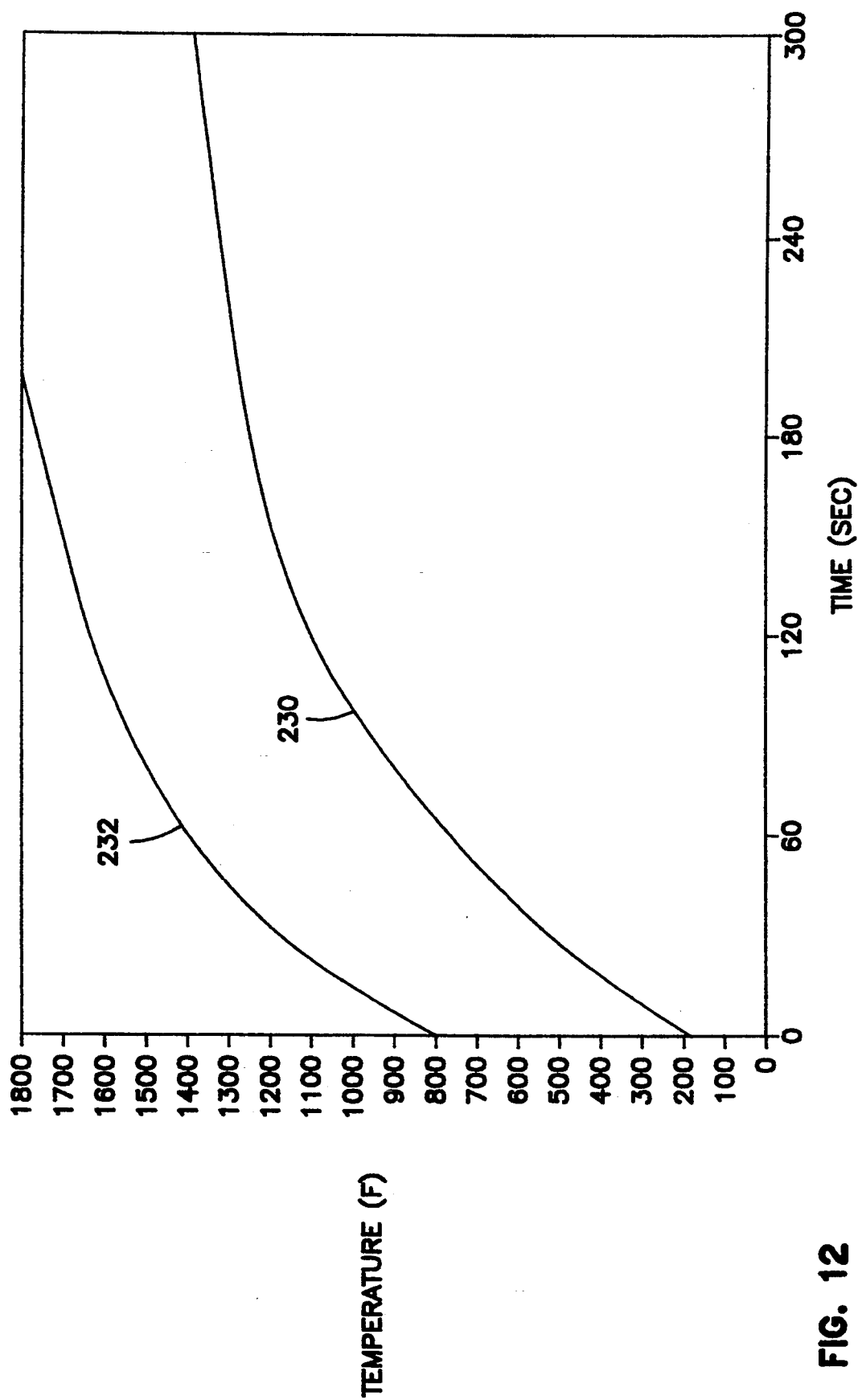
FIG. 12 shows a graph of temperature versus time for mathematically modelled results for two typical heater temperature responses to two system conditions.

An average on-time for a filter module heater based on all possible conditions is generally unacceptable due to the wide range of conditions possible with the same vehicle. That is, an exemplary situation could be as follows. Vehicle system voltage could vary between 12.0 volts at engine idle and fairly high auxiliary electrical loads to 14.5 volts at a high speed, heavy load operation with no auxiliary vehicle electrical loads. Similarly, exhaust gas temperature could vary between about 180° F. at engine idle and 800° F. at a high speed, heavy load operation. Clearly, if the exhaust gases temperature varies so widely, the pre-energization temperature of filter module elements which are filtering the exhaust gases would likewise vary through the indicated temperatures. Additionally, since the power to the regeneration heater depends on vehicle system voltage, the power available would vary depending on the voltage condition of the vehicle. The curves shown on the graph of temperature versus time in FIG. 12 illustrate models of heater temperature response for two different vehicle conditions. Curve 230 illustrates heater temperature response when the vehicle exhaust gases temperature is 180° F. and the vehicle system voltage is 12.0 volts. This condition is typical of engine idle and fairly high auxiliary electrical loads. Curve 232 illustrates heater temperature response when the vehicle exhaust gas temperature is 800° F. and the vehicle system voltage is 14.5 volts. This condition is typical of a high speed, heavy load operation, with no auxiliary vehicle electrical loads. These curves, considered along with the limitations of materials typically used for filter module heaters and of the minimum temperature needed to reliably combust particulates, provide motivation for the need to control heater on-time.

More particularly, the minimum temperature needed for reliable regeneration is approximately 1200° F. The maximum temperature is about 1600° F., since at still higher temperatures the oxidation limit for common heater materials may be reached and, furthermore, the loss of material strength at such higher temperatures can be troublesome. Thus, in the case of curve 232, an appropriate on-time is approximately 105 seconds, while in the case of curve 230, heater on-time could exceed 300 seconds.

Figure 13:
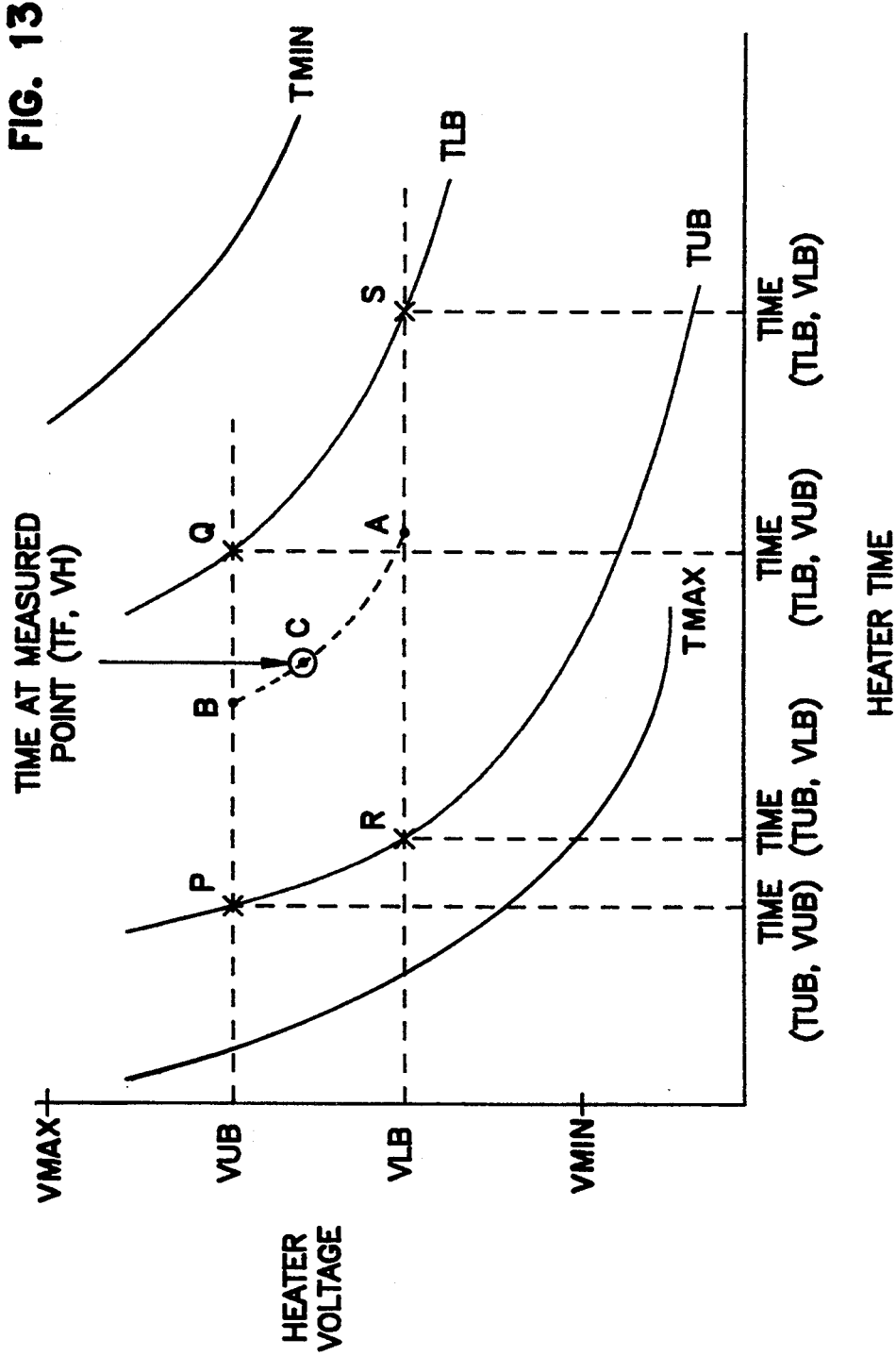
FIG. 13 is a graph of heater voltage versus heater on-time which illustrates the determination of heater on-time as a function of vehicle electrical system voltage and pre-energization heater temperature.

The method for obtaining heater on-time in accordance with the present invention is first summarized with reference to FIG. 13 and is then explained in more disclosure of filter module arrangements 20 and 142, the filter modules requiring regeneration are first taken off-line. That is, exhaust gases are directed to avoid particular modules by closure of the appropriate poppet valve. The initial heater and filter temperature TF is read. Heater and filter temperature TF is then bracketed between two values obtained from a temperature versus time table; a table developed empirically depending on a particular vehicle type and filter module arrangement type. Such table is graphically illustrated by the temperatures and times on the family of curves shown in FIG. 13. For a particular calculation, curve TUB is the temperature upper boundary curve. Curve TLB is the temperature lower boundary curve. VLB is the voltage lower boundary. VUB is the voltage upper boundary. The temperature and voltage points which represent the extremes are shown at points P, Q, R, and S. The times for those points are also indicated. Using the bracket temperature values and initial heater temperature TF the temperature slope TS (see box 248) is calculated. The heater timer is then cleared and started, and the heater is turned on and remains on until the heater timer times out based on a heater on-time calculation which is continuously updated as described hereinafter. That is, heater voltage VH is read. Heater voltage VH is bracketed between voltage values in a voltage table, again graphically represented by voltages and times on the family of curves in FIG. 13. A low heater on-time (see box 316) using temperature slope TS and a heater voltage low value is calculated. Also a high heater on-time (see box 318) using temperature slope TS and a heater voltage high value is calculated. An interpolation (see box 320) between the low heater on-time and the higher heater on-time is made and becomes the "heater on-time". This time is calculated over and over again until the heater timer exceeds the latest "heater on-time" calculated. Then, the heater is turned off and the procedure ends until a different set of filter modules requires regeneration.

Figure 14A:
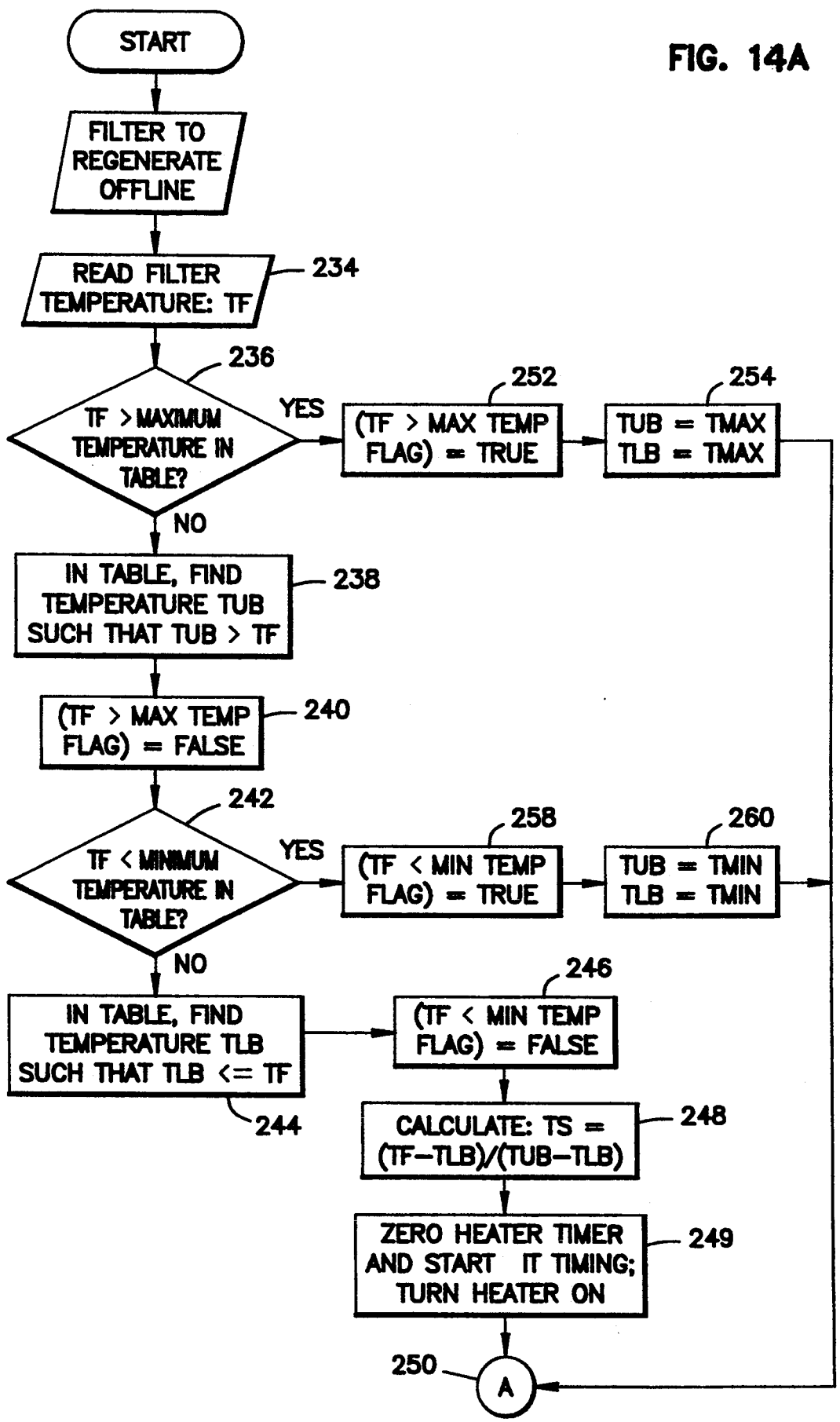
FIG. 14 A-D is a flow-chart illustrating the procedure for the determination of heater on-time as illustrated in FIG. 13.
Figure 14C:
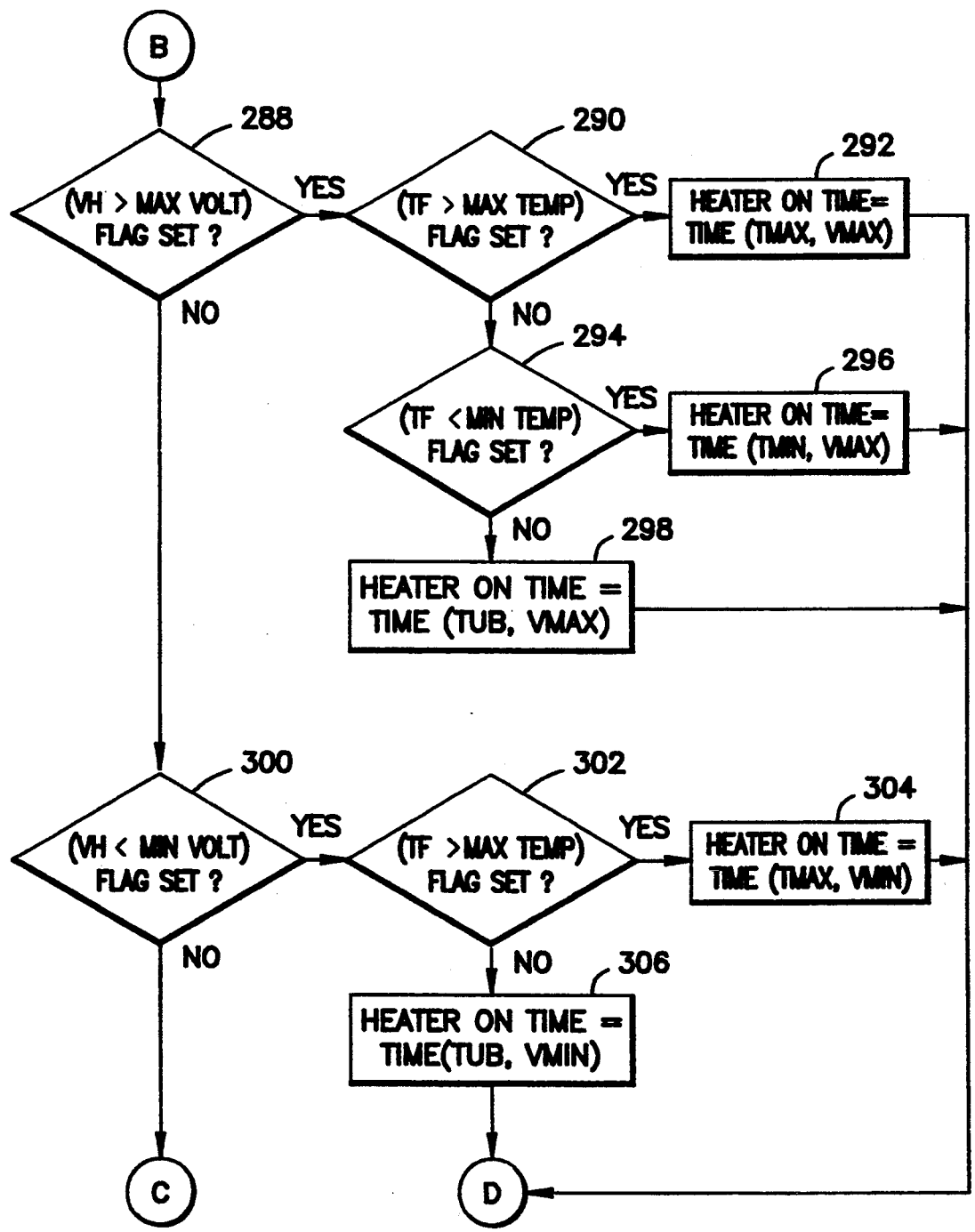
Figure 14D:
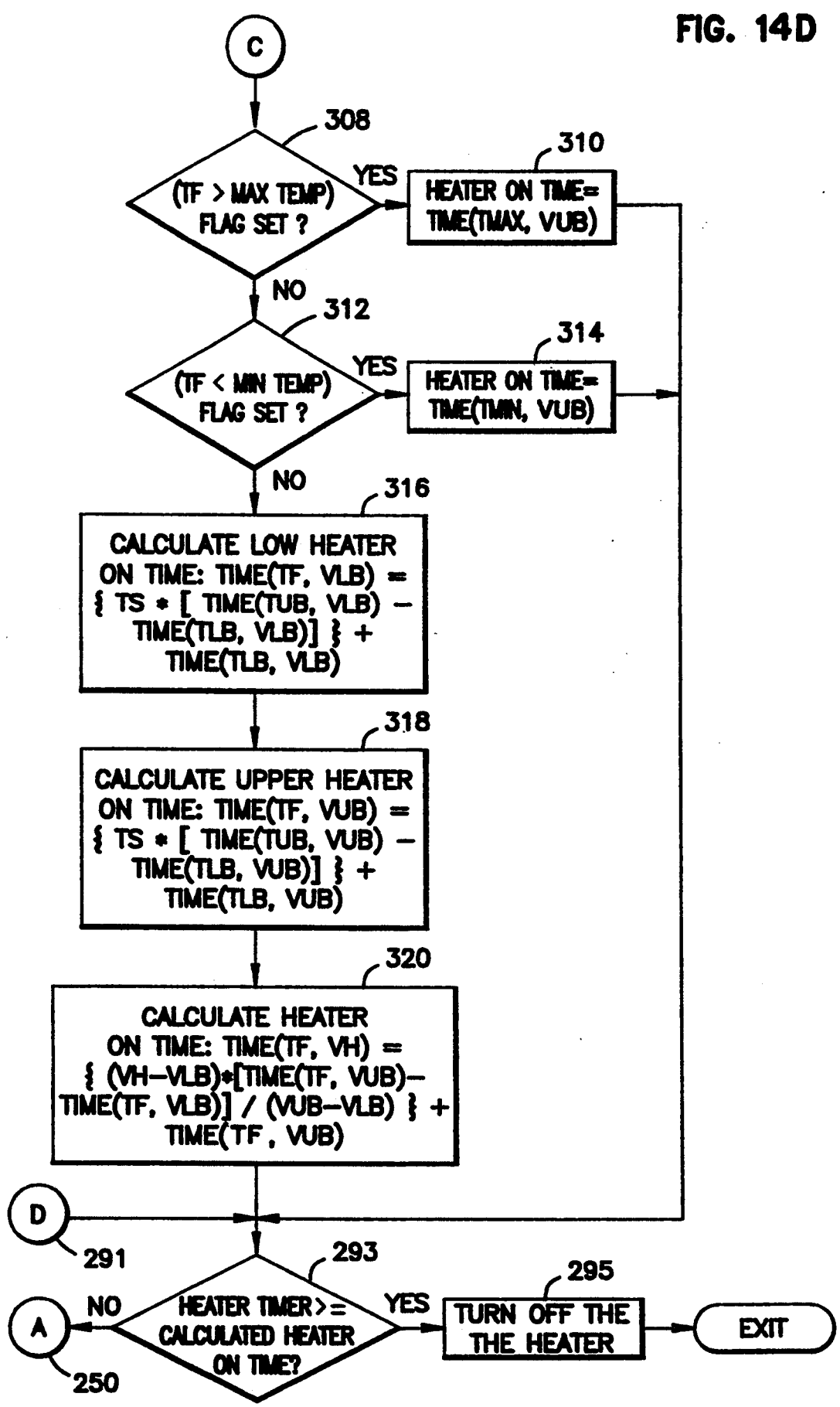

Now with reference to FIG. 14 A–D, the procedure is disclosed in detail. With the filter modules to be regenerated off-line, as indicated at box 234, temperature TF is first read, for example, as obtained at thermocouple 56. As indicated at diamond 236, temperature TF is compared to the maximum temperature in the appropriate temperature table. The maximum temperature (typically 1000° F.) is rarely achieved and would likely occur only in an extreme case of high speed, heavy load operation. If TF is less than the maximum, then as indicated at box 238, a temperature TUB is identified such that temperature TUB is the next greatest temperature in the table greater than filter temperature TF. As indicated at box 240, the "TF greater than maximum temperature flag" is set to "false". As indicated at diamond 242, filter temperature TF is next compared to the temperatures in the table to determine whether it is less than the minimum temperature in the table. The minimum temperature (typically 150° F.) is rarely achieved and would likely occur only at engine idle. If it is not, as indicated at box 244, temperature TLB is found from the table such that it is the temperature equal to TF or the nearest temperature less than TF. Then, as indicated at box 246, the "TF less than minimum temperature flag" is set to "false". Next, the ratio of the difference between heater temperature TF and the next lower temperature from the table compared to the next higher temperature from the table minus the next lower temperature from the table is calculated as temperature slope TS at box 248. The heater timer is zeroed and started, and the heater is turned on at box 249. Then, control of the method proceeds to item 250 at bubble A.

Before proceeding further, if at diamond 236, TF was greater than the maximum temperature in the temperature table, then as indicated at box 252, the "TF greater than maximum temperature flag" is set to "true". As indicated at box 254, the variable TUB is set equal to the maximum temperature and the variable TLB is also set equal to the maximum temperature. Control then shifts as indicated at bubble A at 250.

If TF is less than the minimum temperature in the temperature table as indicated at diamond 242, then as indicated at box 258, the "TF less than minimum temperature flag" is set to "true", and, as indicated at box 260, the variables TUB and TLB are set equal to the minimum temperature. Control proceeds to bubble A at 250.

Next, at box 262, heater voltage is read and given the variable VH. At diamond 264, it is determined whether heater voltage is greater than the maximum voltage in the voltage table. The maximum voltage (typically 15 volts) would likely only occur with a fully charged battery and essentially no auxiliary vehicle electrical loads. If it is not, then at box 266 the variable VUB is given the value of the voltage in the table which is just greater than VH. At box 268, the "VH greater than max volt flag" is set to be "false". Control then proceeds to diamond 270 where VH is compared to the minimum voltage in the voltage table. The minimum voltage (typically 10 volts) would likely only occur at very high auxiliary vehicle electrical loads. If VH is not less than the minimum voltage, then at box 272, the variable VLB is given the value of voltage in the table which is equal to or just less than VH. At box 274, the "VH less than minimum voltage flag" is set as "false". From box 274, control proceeds to bubble B at 276.

If at diamond 264, VH was greater than the maximum voltage in the voltage table, then as shown at box 278, the "VH is greater than the maximum voltage flag" is set as "true". Following that, at box 280, the variables VUB and VLB are set equal to the maximum voltage in the table. Control then proceeds from bubble B to 276.

If at diamond 270, VH was less than minimum voltage (typically 10 volts) in the voltage table, then as indicated at box 284, the "VH less than minimum voltage flag" is set as "true". At box 286, variables VUB and VLB are set equal to the minimum voltage. Control is transferred to bubble B at 276.

At diamond 288, if flag "VH greater than maximum voltage" is set "true", and if at diamond 290, flag "TF greater than maximum temperature" is set "true", then at box 292, the heater on-time is a predetermined time designated TIME (TMAX, VMAX). With the heater on-time for this particular condition obtained, control then advances to circle D at 291 where if at diamond 293 the heater timer has timed more than the predetermined calculated heater on-time, then at box 295, the heater is turned off and the procedure is exited. If at diamond 293, the heater timer is less than the predetermined calculated heater on-time, then control reverts to circle A at 250.

If at diamond 290, however, flag "TF greater than maximum temperature" is "false", but if at diamond 294, flag "TF less than minimum temperature" is set "true", then at box 296, heater on-time is set as a predetermined time designated TIME (TMIN, VMAX). With heater on-time obtained, control then moves to circle D at 291 to advance as previously indicated.

If at diamond 294, flag "TF less than minimum temperature" is "false", then at box 298, heater on-time is a predetermined value designated TIME (TUB, VMAX). Again, with heater on-time provided, control moves to circle D at 291.

If at diamond 288, flag "VH greater than maximum voltage" is "false", then control proceeds to diamond 300. If at diamond 300, flag "VH less than minimum voltage" is "true", and if at diamond 302, flag "TF greater than maximum temperature" is "true", then at box 304, heater on-time is the predetermined value designated TIME (TMAX, VMIN). With heater on-time provided, control moves to circle D at 291.

If at diamond 302, flag "TF greater than maximum temperature" is "false", then at box 306, heater on-time is a predetermined designated TIME (TUB, VMIN). Again, with heater on-time provided, control moves to circle D at 291.

If at diamond 300, flag "VH less than minimum voltage" is "false", and if at diamond 308, "TF greater than maximum temperature" is "true", then at box 310, heater on-time is a predetermined designated TIME (TMAX, VUB). With heater on-time obtained, control moves to circle D at 291.

If at diamond 308, flag "TF greater than maximum temperature" is "false", and if at diamond 312, flag "TF less than minimum temperature" is "true", then at box 314, heater on-time is a predetermined designated TIME (TMIN, VUB). With heater on-time obtained, control moves to circle D at 291.

If at diamond 312, flag "TF less than minimum temperature" is "false", then the low heater on-time is calculated at box 316, the upper heater on-time is calculated at box 318, and an interpolation between the low and upper heater on-times is made at box 320.

That is, low heater on-time is calculated as follows:

TIME (TF, VLB)=(TS-(TIME (TUB, VLB)-TIME (TLB, VLB)))+TIME (TLB, VLB)

Upper heater on-time is calculated from the equation:

TIME (TF, VUB)=(TS-(TIME (TUB, VUB)-TIME (TLB, VUB)))+TIME (TLB, VUB)

The interpolated heater on-time is then calculated from the equation:

TIME (TF, VH)=((VH−VLB)·(TIME (TF, VUB)−TIME (TF, VLB)) / (VUB−VLB)+TIME (TF, VLB)

With reference to FIG. 14, note the latter calculated time of box 320 at point C on the graph. In this regard, point A is the calculated low heater on-time TIME (TF, VLB), while point B is the calculated high heater on-time TIME (TF, VUB).

Thus, the various embodiments and features have been described in detail and the advantages of structure and function set forth. It is understood, however, that equivalents to that disclosed are possible. In this regard, any changes made with respect to the disclosed embodiments, especially in matters of shape, size, and arrangement, to the full extent extended by the general meaning of the terms in which the appended claims are expressed, are also within the principle of the present invention.

What is claimed is:

1. A filter cartridge arrangement for removing particulates from exhaust gases of an engine of a vehicle, comprising:
   a tubular support member;
   a tubular heater;
   tubular means for filtering said particulates retained between said support member and said heater;
   a heater enhancement element; and
   means for energizing said heater so said heater and said heater enhancement element heat the particulates retained by said filtering means to combustion thereby regenerating said filtering means.

2. The arrangement of claim 1 wherein said heater enhancement element includes a tubular, non-filtering, heat insulating sleeve about said heater.

3. The arrangement of claim 2 wherein said sleeve includes a cross-weave material having open areas for exhaust gases flow totaling not less than approximately 10% compared to total wall area available for flow, said open areas having an open square dimension of at least approximately 0.045 inch.

4. The arrangement of claim 3 wherein said material includes smooth strands having a diameter of approximately 0.06 inch, said strands being cross woven with three consecutive strands running under in one direction and one cross strand running over in a cross direction.

5. The arrangement of claim 1 wherein said heater enhancement element includes a heat insulator plugging one end of said tubular heater.

6. The arrangement of claim 1 wherein said heater enhancement element includes a flow distribution ring fastened internally of said tubular heater so that exhaust gases flow is distributed longitudinally more evenly as said gases flow radially through said heater, filtering means, and support element.

7. The arrangement of claim 1 wherein said vehicle has an electrical system and said heater energizing means includes means for controlling on-time as a function of electrical system voltage and heater temperature.

8. The arrangement of claim 7 wherein said electrical system has a range of voltages, said controlling means including means for providing a longer on-time when said voltage is low in said range compared to when said voltage is high in said range.

9. The arrangement of claim 7 wherein said heater has a range of temperatures when unenergized by said heater energizing means, said controlling means including means for providing a longer on-time when said temperature is low in said range compared to when said temperature is high in said range.

10. A filter cartridge arrangement for removing particulates from exhaust gases of an engine of a vehicle, comprising a filter cartridge with a tubular heater and a tubular, non-filtering, heat insulating sleeve about said heater, said arrangement further including means for energizing said heater, said energizing means including means for controlling on-time as a function of electrical system voltage and heater temperature.

11. A method for using a filter cartridge arrangement after a determination that a filter cartridge in the arrangement requires regeneration, said arrangement being in operable communication with an electrical system of a vehicle, the electrical system having a range of voltages, the filter cartridge having a range of temperatures when unenergized by heater energizing means, said method comprising the steps of:
   sensing the voltage of the vehicle electrical system;
   sensing pre-energization temperature of the heater;
   providing energy from said energizing means to said heater; and timing on-time of said energizing means for a period as a function of voltage of said vehicle electrical system and of the pre-energization temperature of said heater;

wherein said on-time is determined so as to combust the particulates in the filter cartridge and so as to keep the temperature of the heater during particulate combustion within a predetermined range of post-energization temperatures.

* * * * *